US008756904B2

(12) United States Patent
Schrattenecker (10) Patent No.: US 8,756,904 B2
(45) Date of Patent: Jun. 24, 2014

(54) HARVESTING ATTACHMENT FOR A HARVESTING MACHINE

(75) Inventor: Franz Schrattenecker, Eggerding (AT)

(73) Assignees: CNH Industrial Belgium nv, Zedelgem (BE); Biso Schrattenecker GmbH, Ort im Innkreis (AT)

(\*) Notice: Subject to any disclaimer, the term of this patent is extended or adjusted under 35 U.S.C. 154(b) by 110 days.

(21) Appl. No.: 12/823,015

(22) Filed: Jun. 24, 2010

(65) Prior Publication Data
US 2010/0326035 A1 Dec. 30, 2010

(30) Foreign Application Priority Data

Jun. 25, 2009 (DE) .................. 10 2009 030 548

(51) Int. Cl.
*A01D 43/00* (2006.01)
(52) U.S. Cl.
USPC ............................... 56/181; 56/228; 56/14.9
(58) Field of Classification Search
USPC .......... 56/51, 153, 208, 228, 320.1, 119, 14.9, 56/181
See application file for complete search history.

(56) References Cited

U.S. PATENT DOCUMENTS

| | | | | | |
|---|---|---|---|---|---|
| 2,529,515 | A | * | 11/1950 | Silva | 171/22 |
| 2,535,614 | A | * | 12/1950 | Ausdall | 180/19.1 |
| 3,599,402 | A | * | 8/1971 | Heising et al. | 56/472 |
| 4,025,681 | A | * | 5/1977 | Donnelly et al. | 428/116 |
| 4,098,061 | A | * | 7/1978 | Spiker | 56/124 |
| 4,609,153 | A | * | 9/1986 | van der Lely | 239/665 |
| 4,715,174 | A | * | 12/1987 | Lloyd et al. | 56/297 |
| 5,157,905 | A | * | 10/1992 | Talbot et al. | 56/15.9 |
| 6,202,395 | B1 | * | 3/2001 | Gramm | 56/10.2 E |
| 6,209,297 | B1 | * | 4/2001 | Yeomans et al. | 56/228 |
| 6,986,397 | B2 | * | 1/2006 | Mattson et al. | 180/11 |
| 7,827,773 | B2 | * | 11/2010 | Sauerwein et al. | 56/181 |
| 7,971,420 | B1 | * | 7/2011 | Bollin | 56/208 |
| 8,061,114 | B2 | * | 11/2011 | Mossman et al. | 56/51 |

FOREIGN PATENT DOCUMENTS

| | | |
|---|---|---|
| AT | 180915 | 1/1955 |
| DE | 956815 | 1/1957 |
| DE | 102004059064 A1 | 7/2005 |
| DE | 102004008342 A1 | 10/2005 |
| DE | 102005016334 A1 | 10/2006 |

\* cited by examiner

*Primary Examiner* — Alicia Torres
(74) *Attorney, Agent, or Firm* — Alleman Hall McCoy Russell & Tuttle LLP (57) ABSTRACT

A harvesting attachment for a harvesting machine includes a frame, and the frame includes an outer wall which defines a cavity in which at least one strut is arranged.

17 Claims, 10 Drawing Sheets

HARVESTING ATTACHMENT FOR A HARVESTING MACHINE

CROSS REFERENCE TO RELATED APPLICATION

This application claims priority to German Patent Application No. 10 2009 030 548.3, entitled "Harvesting Attachment For a Harvesting Machine", filed Jun. 25, 2009, which is hereby incorporated by reference in its entirety for all purposes.

TECHNICAL FIELD

The present disclosure relates to agricultural tools.

BACKGROUND AND SUMMARY

The present disclosure relates to a harvesting attachment for a harvesting machine, wherein the harvesting attachment comprises a frame which is suitable for holding various harvesting tools, in particular cutting units. During the harvesting operation, the harvesting attachment is moved in a forward direction over a field by means of an agricultural harvesting machine and serves to take up certain crops. For example, the harvesting attachment comprises a cutting unit, a reel and further components required and can be mounted on the front side of a combine-harvester. The harvesting attachment likewise can comprise a corn adapter as it is used in a known corn chopper.

In principle, it is currently largely desired in the agricultural machine industry to offer increasingly broad harvesting attachments for self-propelled harvesting machines, which allow the farmer to harvest a field in a shorter time and with less cross-over. However, the maximum width of the harvesting attachment is limited as regards the stability of the construction due to increasing material stress in dependence on the amount of material used. For example, axial area moments of inertia play an important role here, which represent a measure for the bending resistance of the cross-section of the harvesting attachment. Furthermore, acting torsional forces must also be considered when dimensioning the harvesting attachment. Since broadening the harvesting attachment involves a constant increase in dead weight, the forces acting on the harvesting attachment, in particular the bending moment, thus are further increased.

From DE 10 2004 008 342 A1 a harvesting attachment for a combine-harvester is known, which comprises a frame on which a cross-beam extends horizontally and transverse to the forward direction.

DE 10 2005 016 334 A1 discloses a discharge chute for a field chopper, which comprises a frame-shaped or lattice-shaped supporting assembly.

From DE 956 815 B a frame construction for binding mowers is known, which can be manufactured in a lightweight construction.

AT 180 915 B discloses a self-propelled motor mower, whose cutter bar is configured in a lightweight construction in the form of a profile bar.

From DE 10 2004 059 064 A1 an attachment for agricultural harvesting machines for cutting off, taking up and passing on corn plants is known, in which drum-shaped rotary bodies are used, which are made of lightweight materials, in particular of plastic materials or metallic alloys.

It is the object of the present disclosure to provide an improved construction for a harvesting attachment, which allows a reduction of the dead weight and/or an increase in strength of the harvesting attachment. In particular, the construction in accordance with the present disclosure can enable a broader or larger-dimensioned harvesting attachment.

In accordance with the present disclosure, this object is solved by a harvesting attachment for a harvesting machine comprising a frame which includes an outer wall which defines a cavity, wherein at least one strut is arranged in the cavity. The frame serves to hold further harvesting tools and components, in particular a cutting unit. The cavity can, but need not be completely enclosed by the outer wall. The outer wall in particular includes a front wall and a rear wall. The cavity defined by the front and rear walls of the outer wall possibly can be closed completely by one or two side walls. In accordance with the present disclosure, at least one strut is arranged inside the cavity. The strut is connected with the outer wall. The strut is connected with at least one inner surface of the outer wall defining the cavity. It is desirable that the strut is arranged such that a stabilization of the frame is achieved. As compared to harvesting attachments known from the prior art, a considerable saving of weight is achieved by forming a cavity and at the same time the system of struts inside the cavity, without a loss of stability of the entire construction. Due to the saving of raw materials in the manufacture of the harvesting attachment of the present disclosure, a less expensive production method hence is obtained.

Advantageously, the frame has an L-shaped angular shape. In this embodiment, the outer wall can be divided into a horizontally extending area and an area extending vertical thereto. In an operating position, the longer leg of the L-shaped frame extends in vertical direction and the shorter leg lies in a horizontal plane. In the following paragraphs of the description, the surfaces of the outer wall forming the longer leg of the L-shaped frame are designated as front and rear walls, wherein the vertically extending wall lying on the inner surface of the L-shaped frame is referred to as front wall.

A further advantageous development is characterized in that in its cavity the frame includes at least one cross strut which connects the front and rear walls of the outer wall and extends substantially horizontal, possibly vertical to the side wall. The front and rear walls of the frame are connected with each other by a plurality of cross struts. With the L-shaped angular shape of the frame, exactly two cross struts may be arranged one after the other along an axis parallel to the side wall, which connect the front and rear walls of the leg with each other. The cross struts can include recesses. It is conceivable that the width of at least one cross strut is identical to the distance of the two side walls of the frame, so that the two opposed side walls of the frame likewise are connected with each other by the at least one cross strut.

In accordance with a further advantageous development the frame includes at least one longitudinal strut in its cavity, which connects the front and rear walls of the outer wall and extends substantially vertical, possibly parallel to the side wall. The at least one longitudinal strut extends in vertical direction of the frame, wherein the longitudinal strut is configured so broad that it connects the front and rear walls of the outer wall of the frame with each other. Particularly, a plurality of longitudinal struts are arranged inside the cavity of the frame. With an L-shaped angular shape of the frame, the longitudinal struts thus extend in vertical direction along the longitudinal axis of the longer leg of the L-shaped frame, wherein a longitudinal strut may extend from the apex of the L-shape along the longitudinal axis of the longer leg to the upper end thereof.

It can be provided that at least one strut of the entire strut system includes at least one recess. The recesses are arranged in the strut such that on the one hand a reduction of the total weight of the frame is accomplished and on the other hand the stability of the frame is not impaired.

The frame includes at least one tubular through opening, which extends parallel to the front and rear walls of the outer wall. Particularly advantageously, with an L-shaped configuration of the frame a tubular through opening is arranged at the upper end of the longer leg and a second tubular through opening is arranged in the shorter leg of the L-shaped frame. It is also conceivable that through the at least one tubular through opening a required cabling, in particular hydraulic lines, is/are passed for operation of the harvesting attachment. Particularly, the through opening completely extends from one side wall to the opposite side wall of the frame. It can be advantageous when the tubular through openings are configured as a continuous tube. The moment of resistance to bending can be increased thereby.

It is also conceivable that the struts form a honeycomb structure or strut system inside the cavity of the frame. Due to the honeycomb structure, which consists of two-dimensionally arranged, in particular hexagonal cavities, a particularly stable construction of the frame is obtained and at the same time a substantial saving of material is achieved.

Another advantageous embodiment is characterized in that the frame consists of segments which are connectable or connected with each other. It is conceivable that in its width the frame is divided into segments of the same size or into segments of variable size. The connection of the individual segments in particular is effected by screwing the side walls to each other, whereby a positive and/or frictional connection of the segments is obtained. An advantage of the division of the frame into individual segments exists in that the geometry, in particular the width of the frame can also be varied after the production of the frame by adding or removing a segment. This opens up the opportunity for the user of the harvesting attachment to possibly adapt the harvesting attachment to the existing working conditions. Furthermore, the production of such harvesting attachment also can be rendered less expensive due to the division into individual segments. In particular, one segment of the frame as such has at least part of the above-mentioned features of the present disclosure. Accordingly, an individual segment may have an L-shaped angular shape which includes at least one cross strut and/or at least one longitudinal strut. Particularly, an individual segment includes six cross struts and three longitudinal struts as well as two side walls which extend in a direction parallel to the longitudinal struts, wherein the cross struts are arranged vertical to the side walls. The six cross struts can also be interpreted as two broad cross struts arranged on different planes, wherein the cross struts include recesses. The segments can include tubular through openings. Advantageously, the tubular through openings of adjacent segments are in alignment with each other and are connected with each other. The moment of resistance to bending can be increased thereby.

The frame or the segments may be made of cast light metal. For manufacturing the cavity inside the casting, commonly used methods known from the prior art are employed. The resulting recesses in the outer wall of the frame or the segment are covered by at least one sheet mounted on the outer wall comprising the recesses. In particular, the recesses are arranged on the front side of the L-shaped segment or frame and are concealed or closed by two sheets covering the entire front wall of the L-shaped frame or segment, so that during operation of the harvesting attachment no crops or small parts can fall into the cavity of the frame.

It is also conceivable that the frame or a segment is manufactured by means of a light-metal welding method.

Particularly, the frames or the segments are made of aluminum.

Alternatively, the frame or the segments are made of plastics, where they are manufactured by a plastics injection molding method, for example.

The outer wall may have a wall thickness in the range from 4 mm to 6 mm, particularly 4 mm. It is conceivable that a frame or a segment with a wall thickness of 4 mm is made by means of a gravity die-casting method.

The harvesting attachment of the present disclosure advantageously comprises a cutting unit and is mounted on a combine-harvester. In addition to the cutting unit all further components required can be mounted on the harvesting attachment of the present disclosure.

Furthermore advantageously, the harvesting attachment comprises a corn adapter for a corn chopper.

An embodiment of the present disclosure will be explained in detail with reference to the attached drawings, in which:

DETAILED DESCRIPTION

Figure 1:
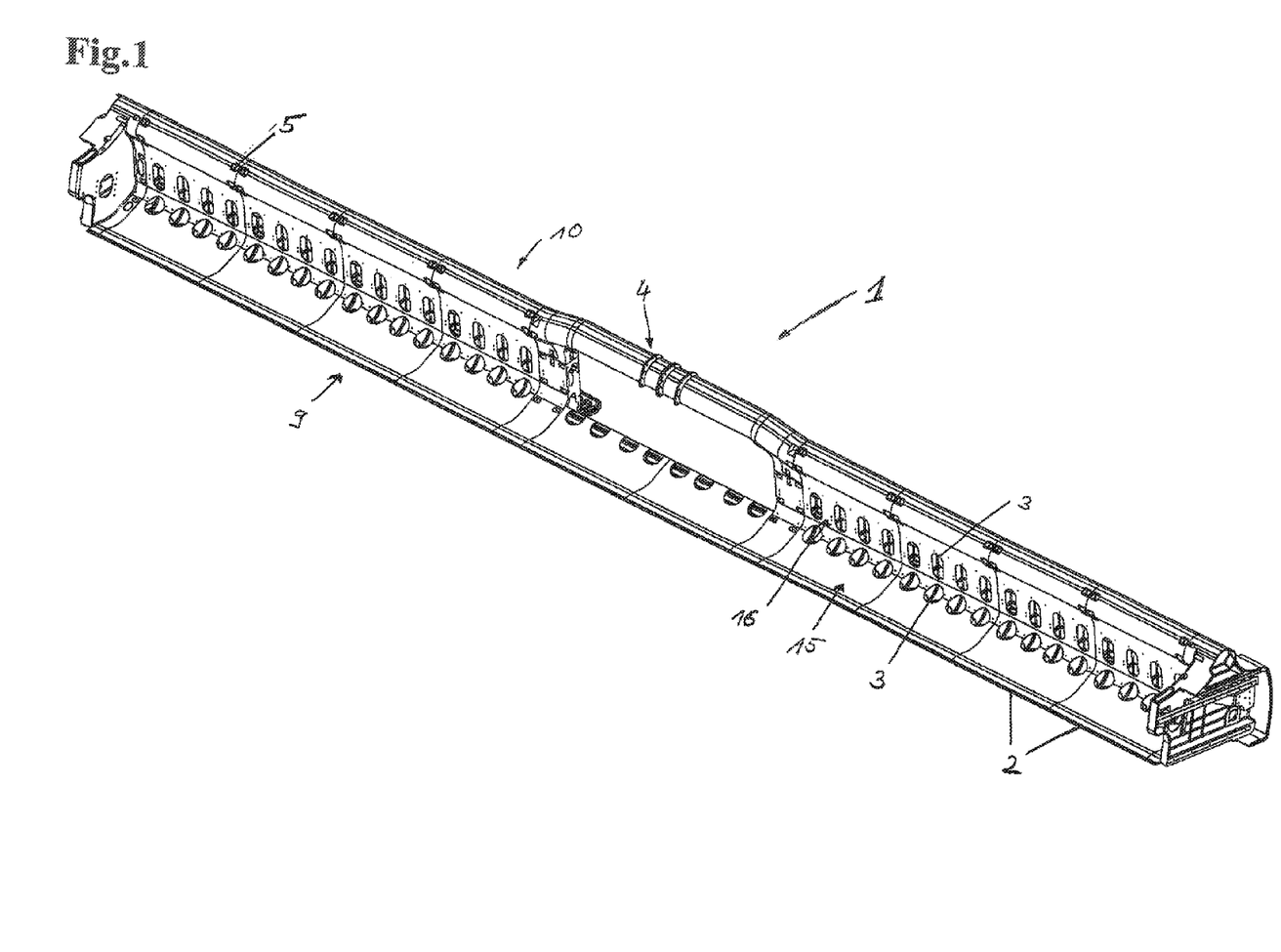
FIG. 1 shows a perspective front view of the harvesting attachment of the present disclosure.

FIG. 1 shows the harvesting attachment of the present disclosure for a harvesting vehicle, which was fabricated of aluminum by means of a metal casting method. As can also be taken from FIGS. 2 and 3, the harvesting attachment comprises a frame 1 which consists of a plurality of at least partly identical segments 2. The entire frame 1 and also the individual segments 2 have an L-shaped angular shape, wherein the first, longer leg 16 is oriented in vertical direction and the second, shorter leg 15 extends in a horizontally extending plane. The segments 2 are mounted one beside the other in direction of the longitudinal axis of the entire frame 1. At about the middle of the longitudinal extension of the frame 1, a holding fixture 4 is disposed, which is characterized by a broad opening inside the surface of the longer leg 16. The holding fixture 4 serves to mount the harvesting attachment on a corresponding counter-point of a suitable harvesting vehicle.

Figure 2:
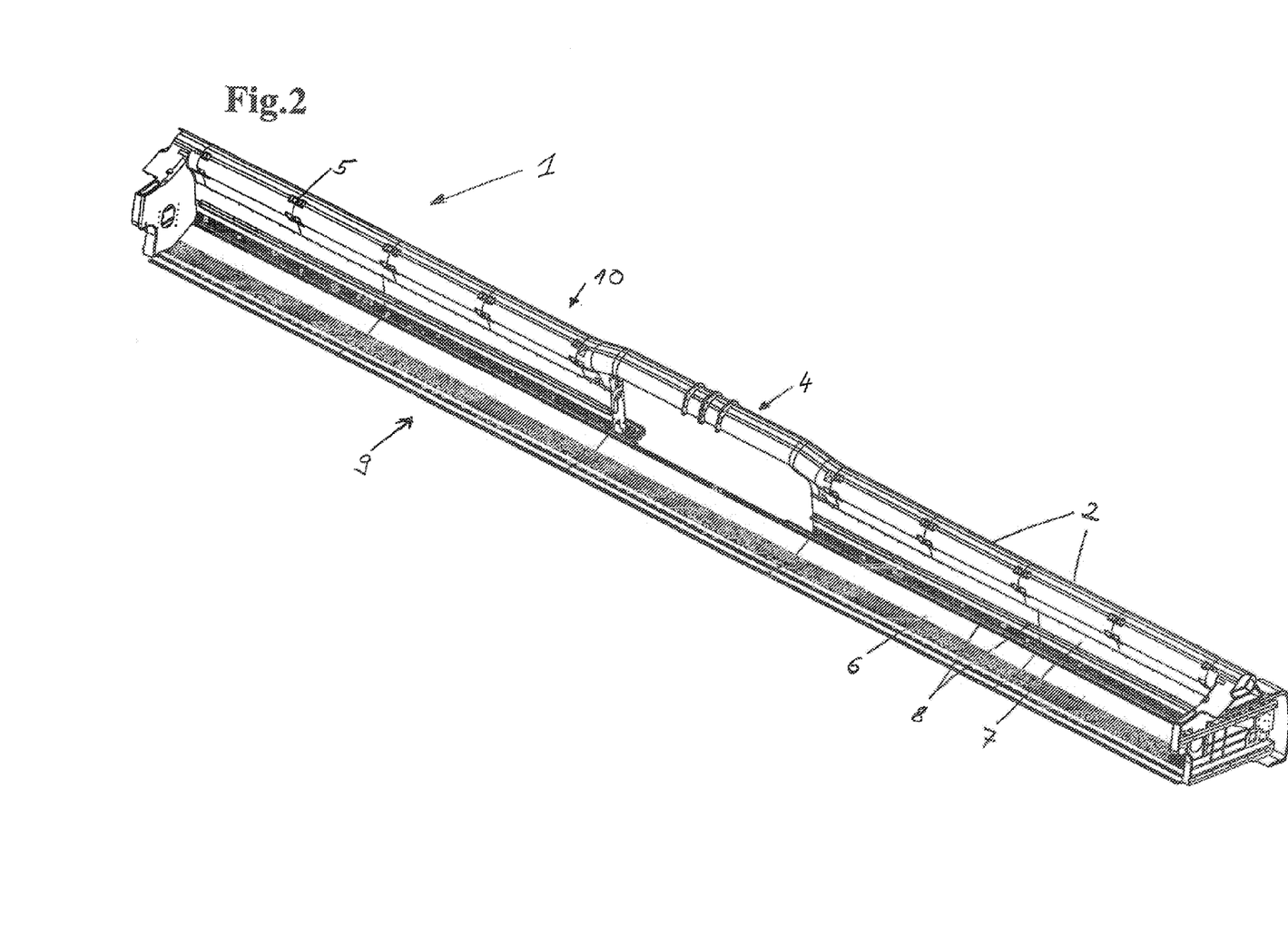
FIG. 2 shows a second perspective front view of the harvesting attachment of the present disclosure.

The front wall of the frame 1 furthermore includes a plurality of recesses 3, which are required due to the employed casting method of the frame 1 or the segments 2. In the interior of the frame 1 or the segments 2 a cavity is disposed, to which reference will be made in the succeeding part of the description with reference to FIGS. 4 and 5. Since the recesses 3 on the front wall 9 of the frame 1 can lead to disadvantages during the working operation, such as the accumulation of crops or small parts in the cavity of the segments 2 or the frame 1, two sheets 7 mounted one beside the other are mounted on the front wall 9 of the frame 1, as shown in FIG. 2. The attachment is effected via a rivet connection or screw connection 8.

Figure 3:
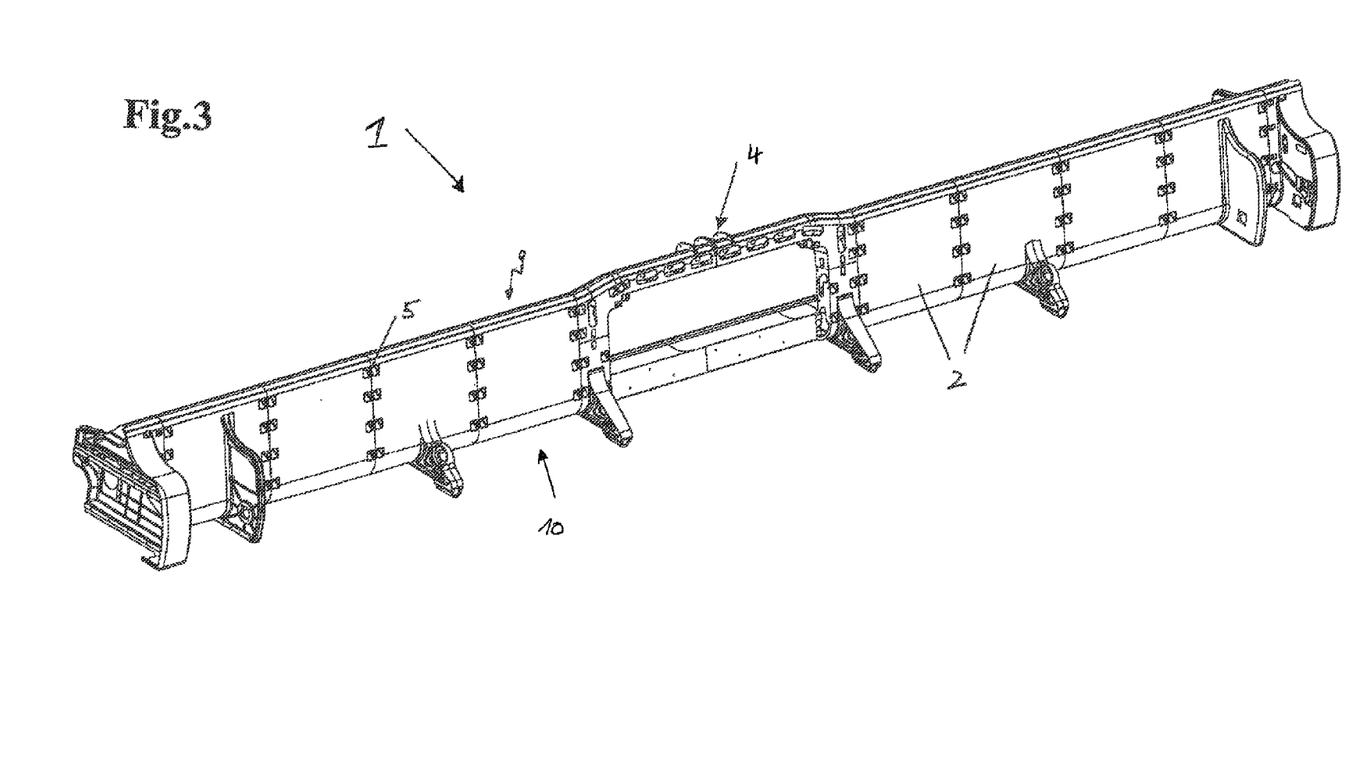
FIG. 3 shows a perspective rear view of the harvesting attachment of the present disclosure.

FIG. 3 shows a perspective rear view of the harvesting attachment of the present disclosure. Reference numeral 10 indicates the rear wall of the frame 1 or the individual segments 2. Each individual segment 2 comprises four orifices 5 laterally at the rear wall 10, which serve for simplified assembly of two adjacent segments 2. It is imaginable that the side walls 14 of the segments 2 are connected with each other via screw connections. The orifices 5, which in simplified form represent a rectangular recess of the rear wall 10 or front wall 9 of the segments 2 or of the frame 1, provide for easy access to the screw connection of two segments 2.

To mount the harvesting attachment of the present disclosure to a corresponding harvesting vehicle, the frame 1 is held by the harvesting vehicle via the rear side 10 of the frame 1 by means of the corresponding holding fixture 4 and suitably fixed.

Figure 4A:
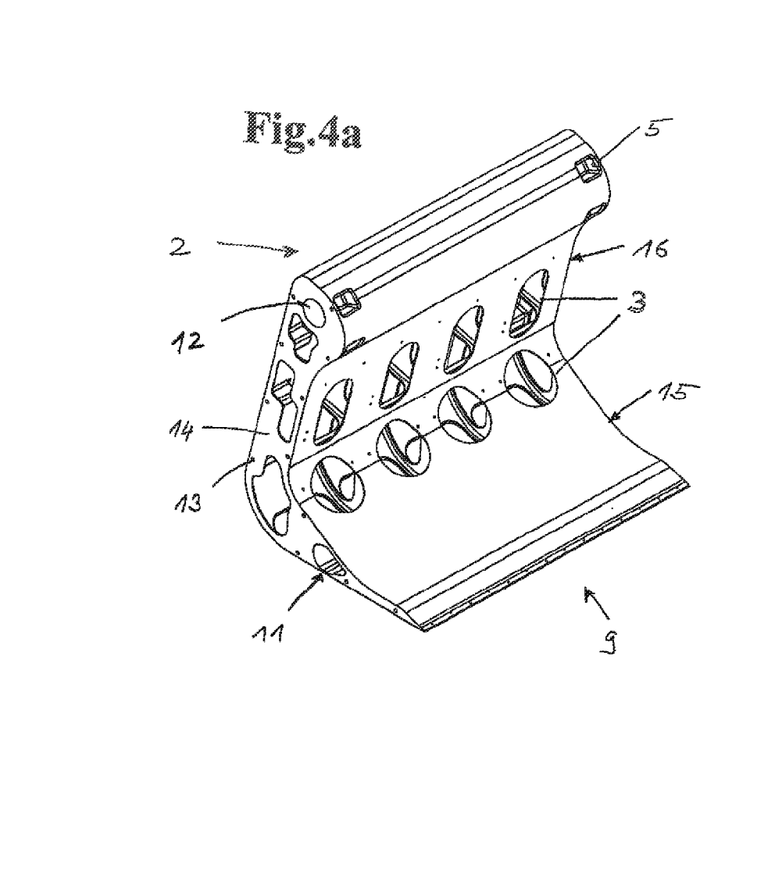
FIGS. 4a, 4b show a segment of the harvesting attachment of the present disclosure in a perspective representation.
Figure 4B:
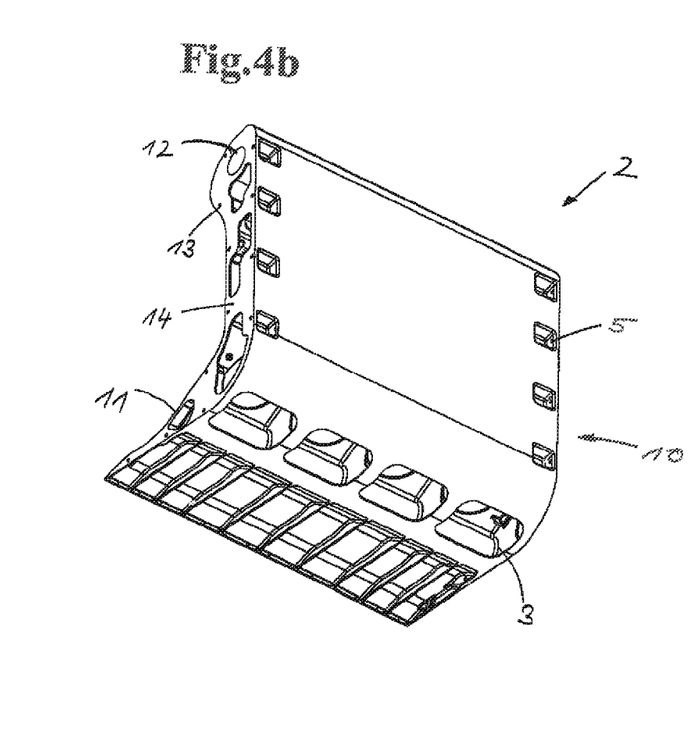

FIGS. 4a, 4b show detailed representations of an individual segment 2 in a perspective front and rear view. The L-shaped angular shape of the segment 2 mentioned above is illustrated again, wherein the front wall 9 of the segment 2 includes recesses 3 both in the region of the longer leg 16 and in the region of the shorter leg 15. On the two side walls 14 of the segment 2 further recesses are also provided. In addition, each segment 2 includes tubular through openings 11, 12, wherein the first through opening 11 extends from one side wall 14 to the opposite side wall 14 of the leg 15. The second tubular through opening 12 extends in the upper region of the longer leg 16 from one side wall 14 to the opposite side wall 14. The through openings 11, 12 additionally serve to accommodate all lines required for actuation of the harvesting attachment and the components arranged thereon by the harvesting machine. Through the recesses 3, a first view of the cavity is offered, which is enclosed and defined by the entire outer wall of the L-shaped segment 2. The struts contained therein will now be explained more concretely with reference to FIG. 5.

Figure 5:
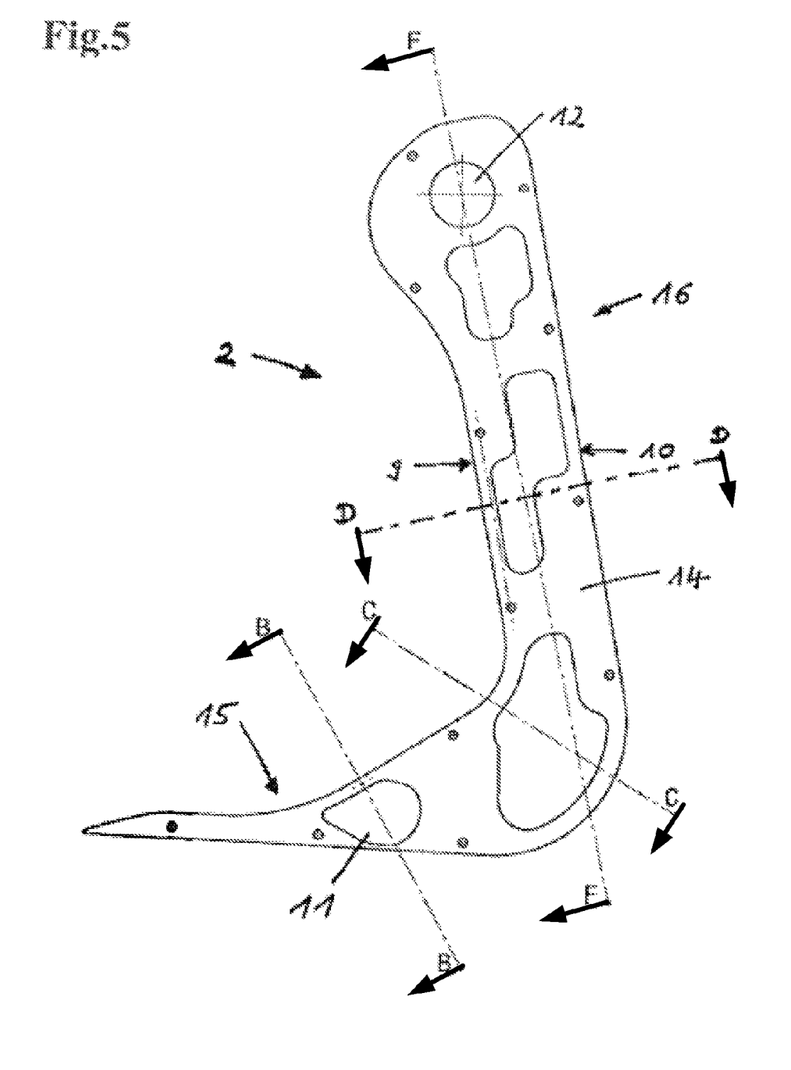
FIG. 5 shows a side view of the segment from FIG. 4a and 4b.

FIG. 5 shows a two-dimensional side view of the L-shaped segment 2. In detail, the Figure shows a view of the side wall 14 of the segment 2, which in the upper region includes the tubular through opening 12, a plurality of recesses 3 and in the lower part, i.e. in the shorter leg 15, the second tubular through opening 11. Furthermore, a plurality of bores 13 can be seen on each side wall 14, which serve for accommodating the screw connection during the attachment of two segments 2.

Figure 5A:
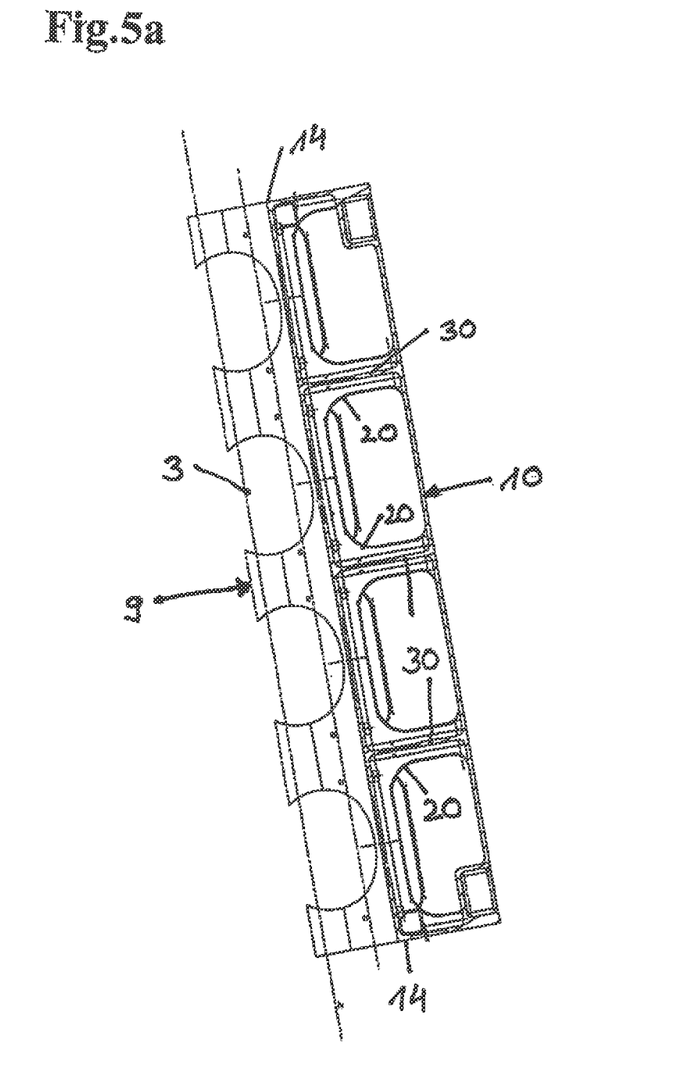
FIGS. 5a-d show sections along lines D-D, C-C, B-B and F-F from FIG. 5.

FIG. 5a shows a section along the cutting axis D-D. Said cutting axis extends transverse to the longitudinal direction of the longer leg 16. Reference numeral 3 symbolizes the recesses of the front wall 9 of the segment 2. The cavity of the segment 2, which is enclosed by the entire outer wall, i.e. front wall 9, rear wall 10 and both side walls 14, includes the cross struts 20. These cross struts 20 extend substantially horizontal and vertical with respect to the side walls 14 from the rear wall 10 to the front wall 9. Moreover, longitudinal struts 30 are additionally arranged in the cavity of the segment 2, which extend substantially vertical, i.e. parallel to the side walls 14, from the apex of the L-shaped segment 2 to the upper end of the longer leg 16. The longitudinal struts 30 are configured with such a width that they likewise connect the front wall 9 and the rear wall 10 of the longer leg 16 with each other along their axis of extension.

Figure 5B:
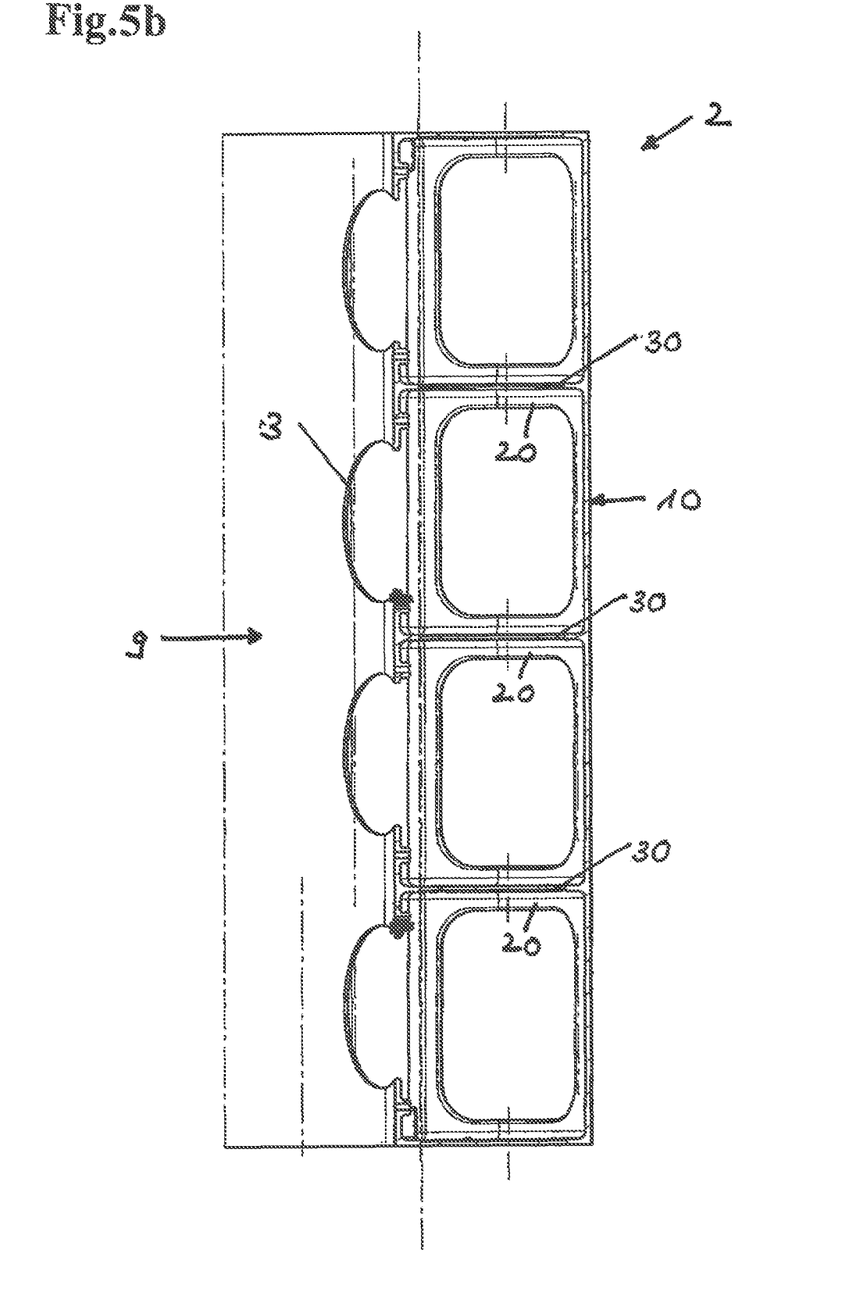

FIG. 5b shows a section along the cutting line C-C of FIG. 5. There are also shown the longitudinal struts 30 extending along the longitudinal axis of the longer leg 16. In addition, further cross struts 20 are shown, which like the cross struts 20 from FIG. 5a are disposed in the cavity with the same orientation. The cross struts 20 from FIGS. 5a and 5b can either be regarded as an individual broad cross strut 20, which extends between the side walls 14 and includes recesses, so that optically individual cross struts 20 are obtained, or they can be regarded as a plurality of, and in one embodiment three, individual cross struts 20. This means that the cavity of the leg 16 each includes three cross struts 20, which are located on different planes transverse to the vertical axis of extension of the longer leg 16.

Figure 5C:
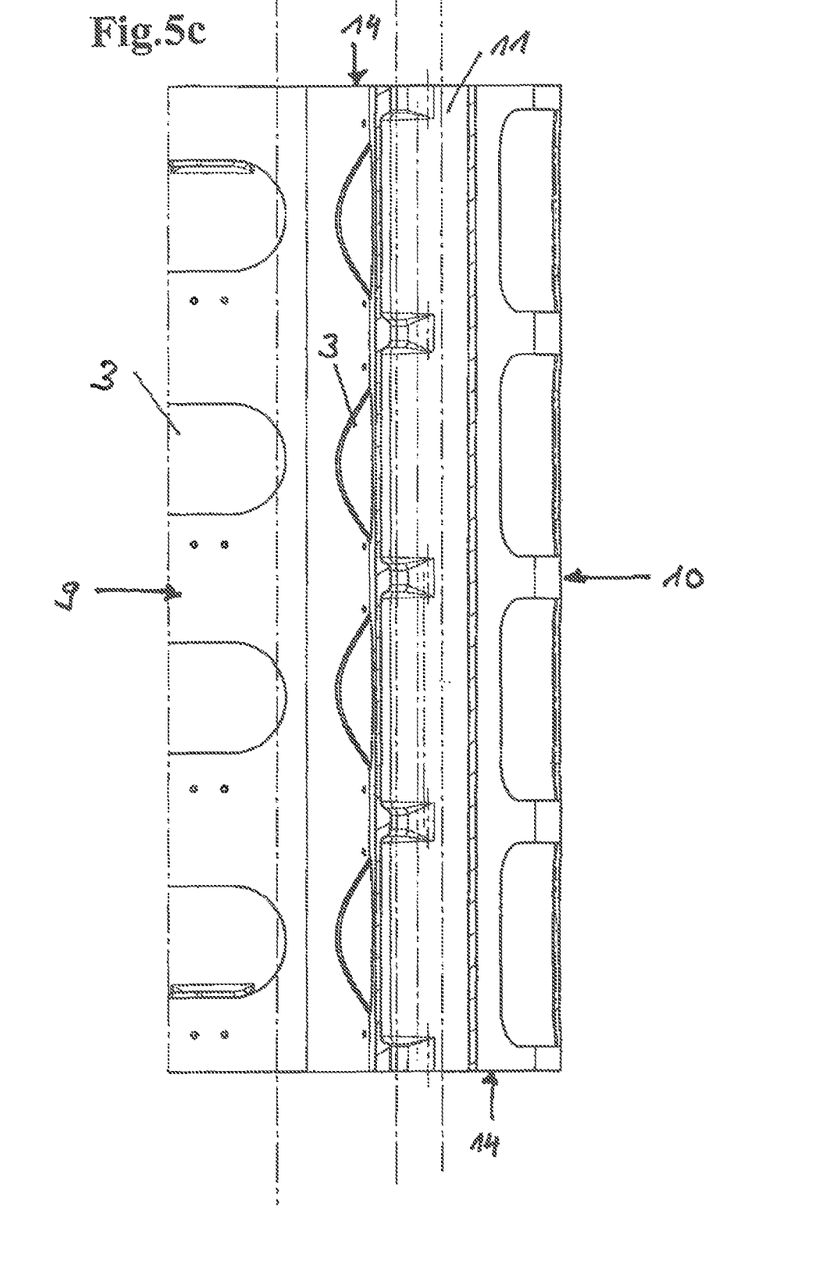

FIG. 5c shows a further cross-section along the cutting line B-B of the segment 2, which extends through the lower, shorter leg 15. Since no significant forces are built up in the lower leg 15 of the segment 2 during operation of the harvesting attachment, a system of struts inside the cavity for stabilizing the frame 1 can be omitted or neglected. In the sectional representation, the tubular through opening 11 is shown in detail, which extends continuously from one side wall 14 to the opposite side wall 14 of the segment.

Figure 5D:
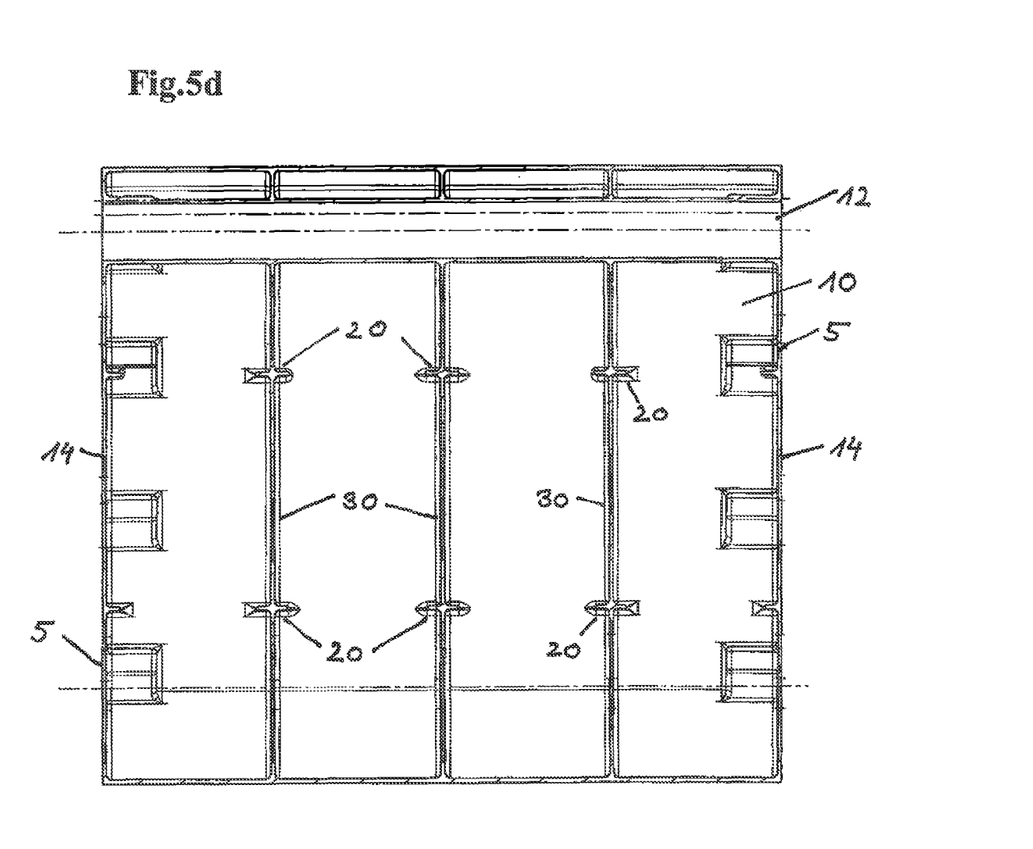

A last sectional representation is shown in FIG. 5d, which shows a cross-section along the cutting axis F-F of FIG. 5. FIG. 5d in detail offers a view of the rear wall 10 of the longer leg 16 of the segment 2. In the upper region of the rear wall 10 the tubular through opening 12 is disposed, which extends from the left side wall 14 to the right side wall 14. Furthermore, three mounting surfaces 5 or orifices 5 each are shown on the side walls 14, which ensure an easier assembly or connection of the individual segments 2. Engagement in these mounting surfaces or orifices 5 is possible to release a screw connection of the two side faces 14 from two segments or fix the same. Likewise, the respective three cross struts 20 are shown again in FIG. 5d, which extend on different planes vertical to the vertical axis of extension of the leg or of the side walls 14. Furthermore, exactly three longitudinal struts 30 are shown, which extend in the cavity of the longer leg 16 of the segment 2 from the lower region, i.e. the apex of the L-shape, to the upper end of the leg 16 parallel to the side face 14. The longitudinal struts 30 are configured such that on the one hand they are arranged on the rear wall 10 and on the other hand are firmly connected with the front wall 9 not shown in FIG. 5d.

Figure 6:
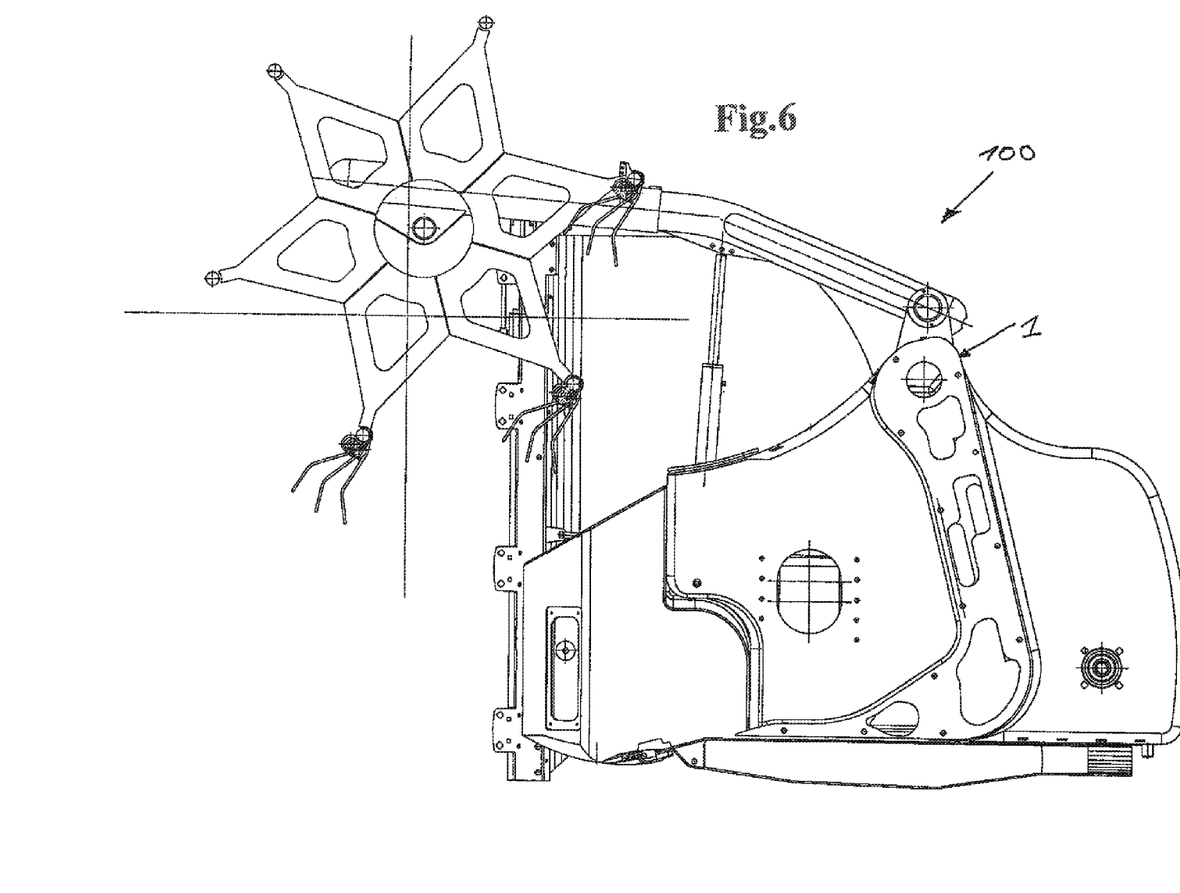
FIG. 6 shows a cutting unit for a combine-harvester with the features in accordance with the present disclosure.

In FIG. 6, the frame 1 of the present disclosure is used to hold a cutting unit 100 for a non-illustrated combine-harvester. Due to the inventive construction of the frame 1, as explained in detail in the preceding paragraph of the description, the cutting unit or the harvesting attachment can be dimensioned broader and larger, whereby a more efficient way of working is obtained for the user. The considerable reduction of weight of the harvesting attachment of the present disclosure on the one hand results in an essential advantage during use of the harvesting attachment, and on the other hand both the transport and the assembly and production of such harvesting attachment are greatly simplified. For example, the construction of the harvesting attachment in accordance with the present disclosure can provide a weight saving of about 40% as compared to a harvesting attachment known according to the prior art. Despite the considerable material savings, the construction in accordance with the present disclosure leads to no impairments with respect to the stability of the harvesting attachment. Moreover, the weight saving results in secondary aspects not to be underestimated. For example, the drive sources of the harvesting vehicle and the fuel reservoir thereof can be dimensioned smaller for operating the harvesting attachment of the present disclosure, which consequently involves further cost savings.

The invention claimed is:

1. A harvesting attachment for a harvesting machine comprising an L-shaped frame, the frame including an outer wall, the outer wall including a front wall, a rear wall, and two side walls, the frame including a holding fixture characterized by an opening in the L-shaped frame, the holding fixture mounting the rear wall to the harvesting machine, wherein a cavity is defined by the outer wall, wherein at least one strut is arranged in the cavity including at least one cross strut connecting the front and rear walls and extending substantially horizontal, and wherein the frame is mounted to a front side of the harvesting machine.

2. The harvesting attachment according to claim 1, wherein a strut system is arranged in the cavity including the at least one strut.

3. The harvesting attachment according to claim 1, wherein the frame includes at least one tubular through opening which extends parallel to the front and rear walls of the outer wall.

4. The harvesting attachment according to claim 1, wherein a plurality of struts are arranged in the cavity.

5. The harvesting attachment according to claim 2, wherein the frame is made of cast light metal.

6. The harvesting attachment according to claim 5, wherein at least one sheet is mounted on the outer wall, which covers a recess in the outer wall.

7. The harvesting attachment according to claim 2, wherein the frame is manufactured by a light-metal welding method.

8. The harvesting attachment according to claim 2, wherein the frame is made of aluminum.

9. The harvesting attachment according to claim 2, wherein the frame is made of plastics.

10. The harvesting attachment according to claim 1, wherein the outer wall has a wall thickness of 4 mm to 6 mm.

11. A harvesting attachment for a harvesting machine comprising:
an angular L-shaped frame, wherein the frame includes an outer wall including a front wall, a rear wall, and two side walls, the outer wall defining a cavity, at least one tubular through opening extending parallel to the front and rear walls; and
a strut system including at least two struts, said at least two struts comprising at least one cross strut which connects the front and rear walls and extends substantially horizontal.

12. The harvesting attachment according to claim 11, wherein at least one strut of the strut system includes at least one recess.

13. The harvesting attachment according to claim 12, wherein the frame includes segments which are connectable or connected with each other.

14. The harvesting attachment according to claim 13, wherein at least one sheet is mounted on the outer wall, which covers a recess in the outer wall.

15. The harvesting attachment according to claim 13, wherein the outer wall has a wall thickness of 4 mm to 6 mm.

16. A harvesting attachment for a harvesting machine comprising:
a cutting unit;
an angular L-shaped frame holding the cutting unit, wherein the frame includes an outer wall which defines a cavity, the outer wall including a front wall, a rear wall, and two side walls, the frame including at least one tubular through opening which extends parallel to the front and rear walls; and
a strut system arranged in the cavity including a plurality of struts, the plurality of struts including at least one cross strut connecting the front and rear walls and extending substantially horizontal, the struts including at least one recess.

17. The harvesting attachment according to claim 1, further comprising a cutting unit held by the L-shaped frame.

* * * * *